Oct. 22, 1963  A. M. CHANTOONI  3,108,066
MEANS FOR PROCESSING FLUIDS
Filed Oct. 2, 1959  2 Sheets-Sheet 1
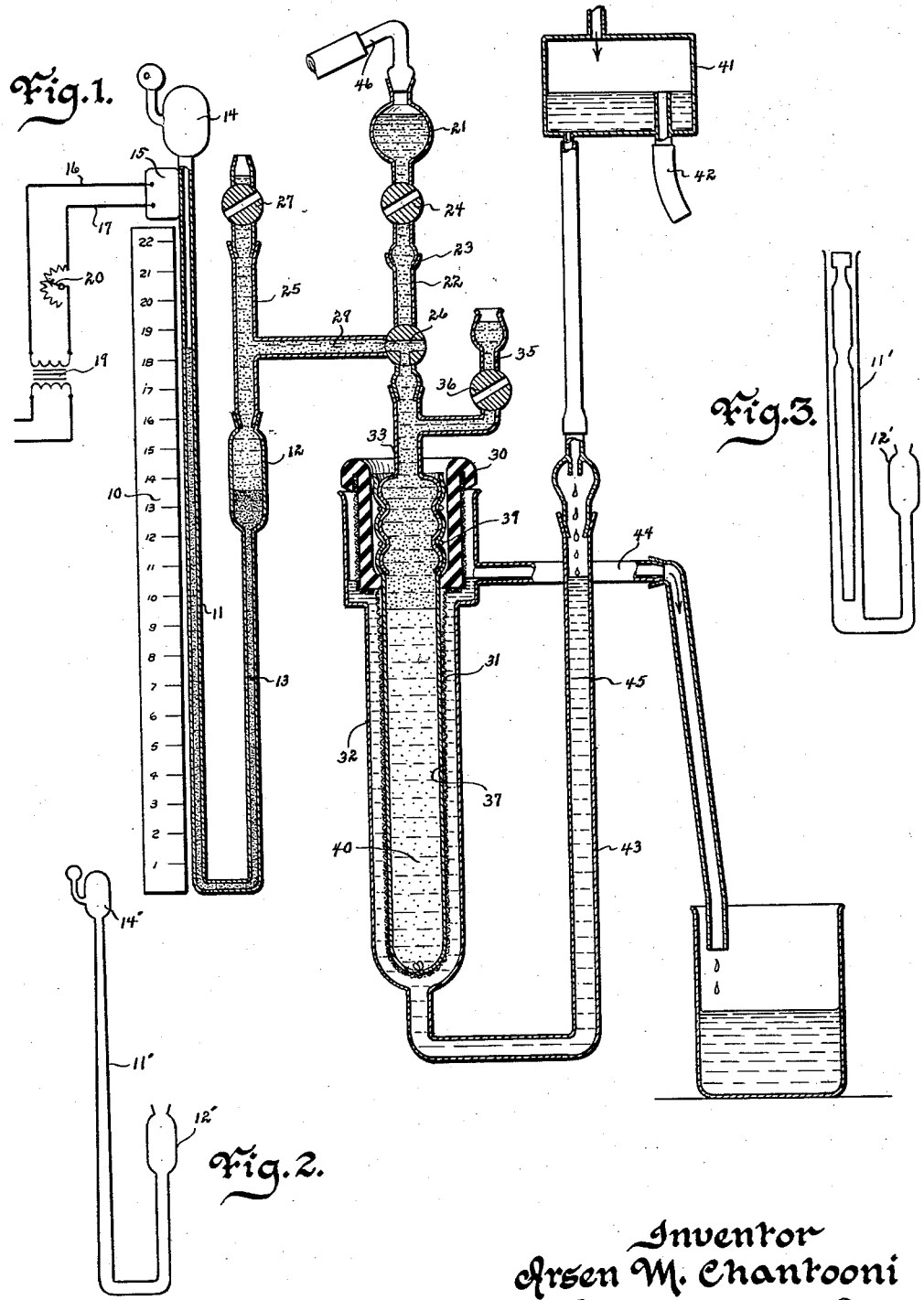
Witness
Edward P. Seeley
Inventor
Arsen M. Chantooni
by M. Talbert Dick
Attorney Oct. 22, 1963  A. M. CHANTOONI  3,108,066
MEANS FOR PROCESSING FLUIDS
Filed Oct. 2, 1959  2 Sheets-Sheet 2
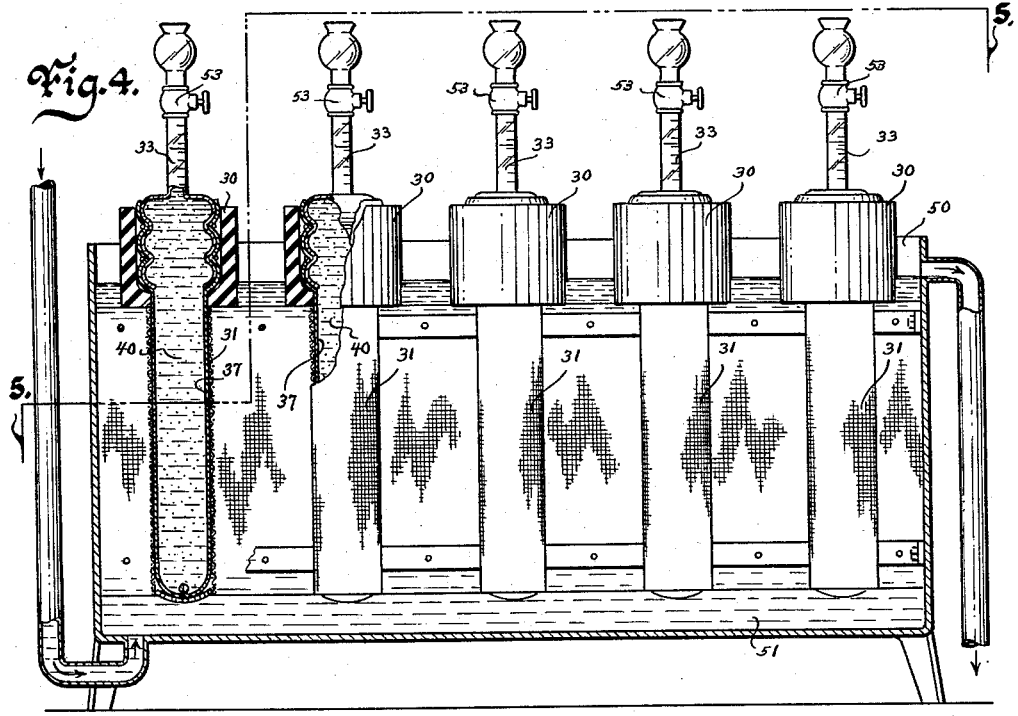
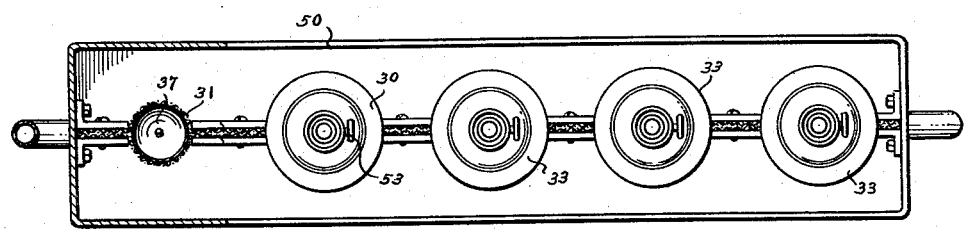
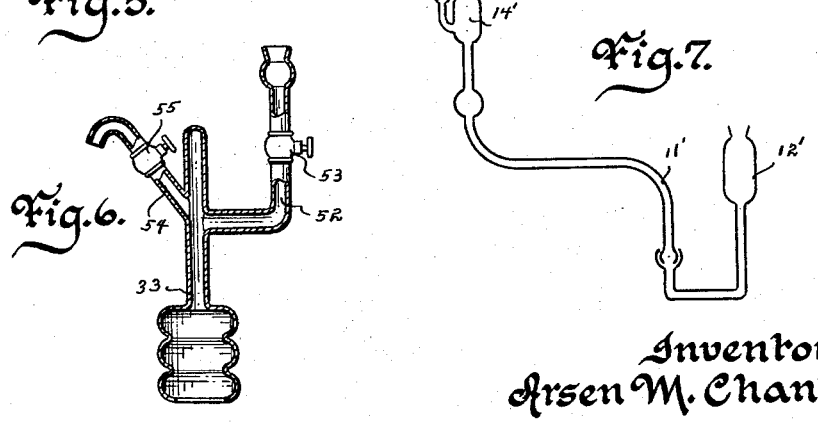
Witness
Edward P. Seeley
Inventor
Arsen M. Chantooni
by M. Talbert Dick
Attorney

United States Patent Office

3,108,066
Patented Oct. 22, 1963

1

3,108,066
MEANS FOR PROCESSING FLUIDS
Arsen Miran Chantooni, 4100 Greenwood Drive,
Des Moines, Iowa
Filed Oct. 2, 1959, Ser. No. 844,056
5 Claims. (Cl. 210—321)

This invention relates to means for processing fluids, and more particularly to a constant volume dialysis apparatus for processing liquids such as milk and like.

In many instances it is highly desirable to remove salt or sugar from milk. Herebefore some effort has been made to accomplish the desired result by an ordinary dialysis process. One of the pressing problems in dairy science is to separate the crystalloids, lactose and mineral salts (electrolytes) from the colloidal constituents, casein and albumins, without causing a chemical (ion) combination to occur between the minerals and the proteins, or between the proteins themselves, or the opposite, a dissociation and loss of cations from already existing protein-cation complexes or reduction of particle size of protein-protein complexes.

Such irreversible combinations of calcium and casein, or molecular binding of protein to protein occur if the concentration of water in the milk is sufficiently decreased as in the preparation of evaporated milk or during a dialysis operation under pressure.

A dissociation and loss of cations from protein complexes or reduction of particle size of complexes occur if the concentration of water in the residue is sufficiently increased as during an ordinary dialysis operation. In this case, as an example, dilution of the residue causes a dissociation of the calcium complexes. The $Ca^{++}$ then is free to permeate the dialysis membrane and will be lost. This prevents one from determining the amount of such complexes in milk or in preparation of salt-free milk which possesses an adequacy of Ca-protein complexes.

Therefore, one of the principal objects of this invention is to provide an apparatus which dialyzes a substance containing colloids and crystalloids without altering the concentration of the colloidal constituents beyond a one (1%) percent tolerance throughout the process.

More specifically the object of this invention is to provide a machine which will accomplish this dialysis phase without causing such variations in the calcium-casein and protein-protein complexes by keeping the concentration of the water in the residue nearly constant throughout all stages of the process of dialysis.

A further object of this invention is to provide an apparatus for preparing salt and sugar-free milk, and may be used to advantage in certain phases of the medical field.

A still further object of my invention is to provide a constant volume dialysis machine as opposed to a constant pressure dialysis machine, and wherein it is possible by the use of my machine to keep the volume constant through the process, thereby preventing the altering of the complexes in the residue.

A still further object of this invention is to provide a constant volume dialysis machine that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side sectional view of one form of structure of my apparatus in use,

2

FIG. 2 is a diagrammatical side view of a modified automatic pressure regulator, FIG. 3 is a side diagrammatical view of a still different modified form of the automatic pressure regulator, FIG. 4 is a side sectional view of a multiple unit or commercial design of my constant volume dialysis machine, FIG. 5 is a top plan and sectional view of the commercial device taken on line 5—5 of FIG. 4, FIG. 6 is a side view of the automatic pressure regulating dialysis thimble attachment, and FIG. 7 is a diagrammatical side view of a modified structure of an automatic pressure regulator.

As herebefore indicated, the purpose of my machine is to dialyze a substance without causing a change in the concentration of the water in the residue. My machine prevents a change in the concentration of the water in the residue by keeping the volume of the residue constant by virtue of the fact that the proportion of volume of crystalloids is negligible and the colloids are undialyzable. The machine will keep the volume constant throughout all stages of the process and not just make the volume at the end of the process the same as at the beginning. Thus, the volume is kept constant throughout the process to prevent altering the complexes in the residue. Hence, this machine can be used whenever it in desired to keep the volume of the residue and hence the concentration of the colloidal constituents nearly constant throughout dialysis.

Referring to the laboratory device as shown in FIG. 1, I have used the numeral 10 to designate a vertical pressure scale with graduations in millimeters. The numeral 11 designates a Pyrex glass or like capillary tubing extending first downwardly at the side of the scale 10 and then extending upwardly to form and communicate with the mercury and mineral oil bulb 12. The mercury within this conduit 11 is designated by the numeral 13 and extends into the bottom portion of the bulb 12 as shown in FIG. 1. The portion of the conduit 11 adjacent the scale 10 extends to a height above the bulb 12 and has on its upper free end the usual bulb 14. The numeral 15 designates a vibrator such as an electric buzzer secured to the conduit 11 and directly below the bulb 14. The numerals 16 and 17 designate two electric lead wires each having an end connected to the vibrator 15 and its other end adapted to be connected to a source of electrical energy. Imposed in these two wires 16 and 17 is an ordinary transformer 19. The numeral 20 designates a rheostat imposed in the wire 17. The numeral 21 designates an oil storage tank having a downwardly extending conduit 22. This conduit has a ball-socket joint 23 imposed in its length and also a value 24, used when filling the system with oil, getting rid of air bubbles, and in conjunction with compressed air hose 46 used for imposing an initial pressure upon the system. The numeral 25 designates a volume displacement relay tube in the form of a T having one of its three ends communicating with a valve 26, used to stop oil flow when disengaging the machine, which also communicates with the conduit 22. The numeral 27 designates a two-way valve communicating with the upper end of the tube 25, used to help in getting rid of air bubbles. The lower end of the tube 25 communicates with the inside top of the bulb 12 as shown in FIG. 1. The supply container 21, conduit 22, tube 25, and the upper portion of the bulb 12 contain mineral oil or like 29. Bentonite/glycerol lubricant is used on all oil-exposed joints and valves.

The numeral 30 designates a flexible resilient collar. The numeral 31 designates an offset-type stainless steel screen thimble having its upper end embracing the collar 30 as shown in FIG. 1. The numeral 32 designates a thimble container spaced apart from but embracing the screen thimble 31. The numeral 33 designates a conduit having its upper end communicating with the valve 26 and its lower portion tightly detachably extending downwardly into the collar 30. The numeral 35 designates an oil and milk filling conduit communicating with the inside top of the member 33 and having imposed in its length a valve 36. The numeral 37 is a plastic sock having its upper end embracing the lower portion of the conduit 33 and its length extending downwardly and inside the screen thimble 31. This plastic sock or thimble acts as the dialysis thimble and is of membrane characteristic, such as Visking Nojax cellulose. The upper end of this plastic thimble 37 may be detachably secured by any suitable means on the lower end of the conduit portion 33 such as string, retaining rings or like 39. The numeral 40 designates milk or like placed within the plastic membrane thimble 37 and having its upper surface contacted by oil or like. The numeral 41 designates a water supply tank having an overflow pipe 42. The numeral 43 designates a water conduit having one end communicating with and inside of the tank 41 and its other end communicating with the inside bottom of the thimble 32. The numeral 44 designates a water escape conduit communicating with the inside upper area of the thimble housing 32 and in a horizontal plane above the bottom horizontal plane of the oil in the thimble 37. The numeral 45 designates water passing from the tank 41, through the conduit 43, into the thimble housing 32, thence upwardly at the outer side of the dialysis thimble, and then out through the escape drain conduit 44. The dialysis thimble must be of the same size as the screen thimble.

With the mercury, oil, milk and water in place as shown, the operation of the device is as follows:

The mercury acting by gravity on the oil will cause the oil, plus its own weight, to bear downwardly under pressure on the upper surface of the milk or like. The wire screen thimble 31 and collar 30 will retain and limit the expansion of the dialysis Visking thimble 37. The water bath is designed to fit the restraining thimble rather closely to insure that the dialyzate is close to isotonic equilibrium at all stages of the process, the same being important for maximum efficiency of dialysis in regard to the volume of water used to dialyze a given amount of material. The water circulates freely around the dialysis thimble and then is exhausted through the conduit 44. The conduits of the device may be silicone-treated to assure complete evacuation so that at least the water tubes will be water-repellent. The dialysis water bath intake tube is connected to a water flow indicator and hydrostat. The vibrator or like 15 is used to alleviate any adhesion of the mercury in the equipment. The pressure scale 10 may be used in testing the efficiency of the machine or for studying the osmotic behavior of the liquid being processed.

Because the specific free energy of water is greater flowing next to the dialysis thimble than in the residue (milk) inside the thimble (due to the fact that the concentration of salts is greater in the residue than in the water), there exists a tendency for translocation of water into the dialysis thimble. Also, the specific free energy of the salts is greater in the milk than in the water, and thus the salts in the residue tend to be translocated into the water.

As water diffuses into the dialysis thimble the volume of its contents tends to increase. As salts are removed from the milk, the volume of the contents in the dialysis thimble tends to decrease due to salt loss, however, this decrease is very small when compared with the increase due to water translocation.

This volume increase creates a pressure (if the machine were "perfect," that is, if the dialysis thimble were not expandable and perfectly sealed and if a stopper were used in place of the Automatic Pressure Regulator and therefore if the system were perfectly incompressible the pressure would equal the osmotic pressure of the contents of the tube) inside the thimble which causes it to inflate until it touches (is bounded by) the restraining thimble (since the restraining thimble is of approximately the same size as the dialysis thimble the pressure required to do this is insignificant) and cannot expand further. When the dialysis thimble is so expanded the machine is able to automatically keep the volume of the residue nearly constant (to ±1% for milk).

Owing to the fact that the system is closed and all air is displaced with incompressible oil, any further increase in the volume of the residue causes displacement of an equal volume of oil into the volume displacement relay tube and hence into the oil-Hg displacement bulb. This causes an equal volume of Hg to be displaced from the oil-Hg displacement bulb into the capillary tube causing the Hg level to rise therein. This causes an increase in pressure (up to 198.5 mm. Hg at 55 min. for milk using 0.5 mm. capillary) upon the oil and in turn upon the residue which tends to make negative the rate of translocation of water into the residue and therefore the rate of increase of the volume. Meanwhile the crystalloids diffuse out of the residue into the water, causing a lowering of crystalloid hydrostatic potential which results in a lowering of the tendency for translocation of water into the dialysis thimble, which when coupled with the above mentioned tendency for a negative rate of translocation in turn tends to result in a lowering of the volume. However, any decrease in volume of the residue allows an equal volume of oil to leave the oil-Hg displacement bulb which results in a lowering of the Hg level in the capillary tube which in turn causes a lowering of the pressure (10 mm. Hg at 1870 min. for milk using 0.5 mm. capillary) which in turn tends to allow an increase in the rate of water translocation. Thus the volume of the residue is automatically kept nearly constant throughout the process.

The machine allows the volume to increase only very slightly (to a tolerance of approximately 1%) at the beginning of a run giving sufficient time for the crystalloids, which cause such a rise in pressure, to gradually diffuse out of the residue, without causing an excessive pressure which would rupture the dialysis thimble or alter its pore size. After this has taken place the pressure is allowed to build up for any increasing in volume of the residue, which it does not do to too great an extent owing to the fact that the residue is already nearly depleted of the crystalloids. However, the pressure increase which does take place in the event of a volume increase is sufficient to regulate the latter.

The smaller the bore of the capillary tube, the greater the rise in height of the column per an equivalent volume displacement of Hg and hence of residue. Thus the smaller the bore of the capillary tube, the greater is the sensitivity of adjustment, or adequacy of adjustment, of the volume of the residue. However the bore of the capillary should not be too small, as its function is to allow for a slight increase in volume at first and a gradual increase in pressure, because the smaller the bore of the capillary tube, the greater is the strain on the dialysis thimble. Therefore the right size bore should be chosen in accordance with the type of substance being dialyzed and the type of dialysis thimble used, the machine being furnished with a set of capillary tubes.

In the dialysis of certain substances, or when using special dialysis membranes it is necessary to allow for a greater volume increase at certain "operating pressures" without causing a great increase in pressure and to this end the machine can be equipped with modifications of the capillary in which the bore is not constant with height. The effective diameter of the bore at a given height determines the rate of pressure increase upon the system at a given volume of residue increase. These modifications include tapered capillaries as in FIG. 2, wide mouthed tubes with immovable shaped plungers as in FIG. 3, curved capillaries, bulbs and ball and socket joints used for inclining the capillary as in FIG. 7.

The Visking sock 37 is treated prior to use by being cut a little larger than the right length, soaked with water, knotted on one end, filled with water and inverted such that the knot is on the inside of the resulting thimble. The open end of the thimble is cut off such that the edge is straight. Water is thoroughly drained out and the open end of the thimble is fitted over and tied with wet string onto the dialysis thimble attachment. The collar 30 is fitted over the above, and this fitted into the screen thimble 31. The above is then fitted into the water bath 32 and these raised to fit the assembly 33 onto the tube 29.

If a skim milk is being processed, it is first centrifuged from whole milk and then placed in the membrane sock container 37. Then oil or like is added through 35 so that no air bubbles remain in the system. Valve 35 is then closed and vibrator 15 turned on. The water bath 32 is then filled with water, whereafter it should be permitted to drop rather slowly through conduit 43. It may be desired to speed up the pressure in order to insure expansion of the dialysis thimble against the wall of the restraining thimble by first opening valve 24 and forcing air under pressure through pipe 46, after which the valve 24 is closed. With the various valves closed the machine is in condition for automatic adjustment of pressure.

The weight of the oil will exert a certain amount of pressure upon the dialysis thimble, and will cause it to fit snugly enough against the wall of the restraining screen thimble.

To test the efficiency of the machine a differential reading on the pressure scale is taken every five minutes, starting with the zero min. reading, 115 mm. Hg, and the temperature of the dialyzate is taken. Graphs are plotted indicating the relationships between pressure and time and final volume, or volume gain, of residue and time of run.

In such a test the pressure vs. time graph should correspond to a standard graph for the type of substance and capillary bore used. The difference between the final and initial volumes should not exceed 1% of the initial volume regardless of the time length of the run.

The sugars and salts in the milk will pass through the membrane of the sock container 37 and be washed away obviously by the water bath. After the operation the plastic sock container 37 will be carefully removed, care being taken to not have its contents mixed with any of the oil, and then its weight and volume are recorded for the desired efficiency and answers. If the desired degree of removal of crystalloids is achieved while not varying the volume at any stage of the process beyond a one percent tolerance, the machine will be successful.

Still another phase would be where volume would be an important factor and therefore in FIGS. 4, 5 and 6, I show a modified structure for volume or commercial usage. In such a commercial model, I provide a water tank 50 through which water 51 flows continuously. Instead of having one unit consisting of the members 30, 31, 33, 37 and 39, I provide a plurality of such units extending into the tank 50, as shown in FIG. 4. By this construction the thimble 32 is eliminated. In this commercial equipment I dispense with the oil, and have the upper area of the conduit 33 translucent and calibrated. By eliminating the oil and mercury phases, the inconvenience of separating the oil from the milk after dialysis is eliminated. In the commercial structure I provide an inlet pipe 52 communicating with the inside of the upper end of each of the conduits 33, and in which is imposed a valve 53. The numeral 54 designates an outlet spigot communicating with the inside of the upper end of each of the conduits 33, imposed in which is a valve 55. Thus, in the commercial structure, instead of a pressure regulator as herebefore described, I use an air pocket in the upper area of each of the conduits 33 as shown in FIG. 6. Obviously, the greater the amount of air within the air pocket, the more gradual the adjustment of the volume, and the less likely the thimble 37 will be ruptured. Obviously, after the units have been filled with the milk to be processed, the valves 53 and 55 are closed. After the processing has been completed, the residue within the units is poured through the outlet member 54 and the units are then ready for reuse.

Some changes may be made in the construction and arrangement of my method of and means for processing fluids without departing from the real spirit and purpose of my invention, and it is my intention to cover by my claims, any modified forms of structure or use of mechanical equivalents which may be reasonably included within their scope.

I claim:

1. In a dialysis machine, comprising in combination, a water container, a water supply means, a pipe having one end communicating with said water supply means and its other end communicating with the inside bottom of said water container, a water discharge pipe having one end communicating with the inside top area of said water container, a dialysis plastic cellulose closed thimble having membrane characteristics extending into said water container, a liquid to be processed in said thimble, a conduit communicating with the inside top of said thimble, an oil supply source communicating with said conduit, an oil in said conduit and in contact with the top of the liquid to be processed in said thimble, a vertical pipe means, mercury in said vertical pipe means, and a connecting pipe having one end communicating with the inside top area of said vertical pipe means and its other end communicating with the inside of said conduit; said oil in said conduit being in contact with said mercury in said vertical pipe means.

2. In a dialysis machine, comprising in combination, a water container, a water supply means, a pipe having one end communicating with said water supply means and its other end communicating with the inside bottom of said water container, a water discharge pipe having one end communicating with the inside top area of said water container, a dialysis plastic cellulose closed thimble having membrane characteristics extending into said water container, a liquid to be processed in said thimble, a conduit communicating with the inside top of said thimble, an oil supply source communicating with said conduit, an oil in said conduit and in contact with the top of the liquid to be processed in said thimble, a vertical pipe means, mercury in said vertical pipe means, a connecting pipe having one end communicating with the inside top area of said vertical pipe means and its other end communicating with the inside of said conduit; said oil in said conduit being in contact with said mercury in said vertical pipe means, and means for introducing air under pressure into said conduit.

3. In a dialysis machine, comprising in combination, a water container, a water supply means, a pipe having one end communicating with said water supply means and its other end communicating with the inside bottom of said water container, a water discharge pipe having one end communicating with the inside top area of said water container, a dialysis plastic cellulose closed thimble having membrane characteristics extending into said water container, a liquid to be processed in said thimble, a conduit communicating with the inside top of said thimble, an oil supply source communicating with said conduit, an oil in said conduit and in contact with the top of the liquid to be processed in said thimble, a vertical pipe means, mercury in said vertical pipe means, a connecting pipe having one end communicating with the inside top area of said vertical pipe means and its other end communicating with the inside of said conduit; said oil in said conduit being in contact with said mercury in said vertical pipe means, and means for vibrating the mercury in said vertical pipe means.

4. In a dialysis machine, comprising in combination, a water container, a water supply means, a pipe having one end communicating with said water supply means and its other end communicating with the inside bottom of said water container, a water discharge pipe having one end communicating with the inside top area of said water container, a dialysis plastic cellulose closed thimble having membrane characteristics extending into said water container, a liquid to be processed in said thimble, a conduit communicating with the inside top of said thimble, an oil supply source communicating with said conduit, an oil in said conduit and in contact with the top of the liquid to be processed in said thimble, a vertical pipe means, mercury in said vertical pipe means, a connecting pipe having one end communicating with the inside top area of said vertical pipe means and its other end communicating with the inside of said conduit; said oil in said conduit being in contact with said mercury in said vertical pipe means; said vertical pipe means being in the form of a U-shaped member, with one of its uprights communicating with said connecting pipe, and a bulb on the other upright of said vertical pipe means.

5. In a dialysis machine, comprising in combination, a water container, a water supply means, a pipe having one end communicating with said water supply means and its other end communicating with the inside bottom of said water container, a water discharge pipe having one end communicating with the inside top area of said water container, a dialysis closed thimble having membrane characteristics extending into said water container, a liquid to be processed in said thimble, a conduit communicating with the inside top of said thimble, an oil supply source communicating with said conduit, an oil in said conduit and in contact with the top of the liquid to be processed in said thimble, a vertical pipe means, mercury in said vertical pipe means, and a connecting pipe having one end communicating with the inside top area of said vertical pipe means and its other end communicating with the inside of said conduit; said oil in said conduit being in contact with said mercury in said vertical pipe means.

References Cited in the file of this patent

UNITED STATES PATENTS

| | | |
|---|---|---|
| 1,331,732 | Wait | Feb. 24, 1920 |
| 2,276,986 | Kemp et al. | Mar. 17, 1942 |
| 2,365,457 | Daniel | Dec. 19, 1944 |
| 2,568,990 | Daniel | Sept. 25, 1951 |